United States Patent Office.

JOHN SNOW, OF GRAND RAPIDS, MICHIGAN.

Letters Patent No. 96,496, dated November 2, 1869.

IMPROVED CATARRH REMEDY.

The Schedule referred to in these Letters Patent and making part of the same.

*To all whom it may concern:*

Be it known that I, JOHN SNOW, of the city of Grand Rapids, Kent county, Michigan, have invented a new and useful composition of matter, to be used as and for a Remedy for the Cure of Catarrh, bronchitis, common colds, and other like affections of the head and throat; and I do hereby declare the following to be a full, clear, and exact description of the manner of making, compounding, and using the same.

My invention consists of a dry, finely-pulverized powder, formed by the mechanical mixture and compounding of certain ingredients, well known to commerce, in certain stated proportions, to be taken internally, as hereinafter set forth, in suitable doses, by those who are afflicted with the diseases above named, and those kindred thereto.

To enable others to make and compound my invention, I will proceed to give the ingredients of which it is composed, state the proportion in which the same are used, and also the manner in which my invention is compounded.

In the preparation of a quantity of my Snow powder, there should be used ten (10) parts, by weight, of pulverized gum-arabic, of the best quality known to commerce, and one (1) part, by weight, of morphine, of the best quality.

The several ingredients above named, in the proportions specified, should be mixed together thoroughly in a suitable and convenient dish, and then boxed or bottled for use.

The mixing of said ingredients is only mechanical, and they may be used in the state and condition in which they are prepared for sale in commerce, the very best quality of each only being used.

To use my invention as a cure for catarrh, or a cold in the head, it should be snuffed or drawn up into the nostrils, so as to be spread or sprinkled over the parts affected, and when used for the bronchitis, or any affection of the throat, it should be placed upon the tongue, as near as may be to its roots, and be allowed to dissolve and penetrate to the parts diseased.

The size of the doses to be administered will be best determined by the judgment of the patient, or of his physician, only a small quantity being needed at a time. The doses should be repeated from time to time until relief and cure are experienced.

This invention, when carefully prepared as above described, will effect a speedy and permanent cure of catarrh and bronchitis, and in the limited experience of the inventor with his invention, he has never known it to fail of a cure.

What I claim to have invented, and desire to secure by Letters Patent of the United States, is—

The composition of a powder, for the cure of catarrh, bronchitis, and other like affections, from the ingredients named above, compounded and prepared substantially as set forth.

JOHN SNOW.

Witnesses:
M. W. BATES,
OMAR H. SIMONDS.